(12) United States Patent  (10) Patent No.: US 6,431,232 B1
Seymour  (45) Date of Patent: Aug. 13, 2002

(54) DELIMBER

(75) Inventor: Kerry Seymour, 1009 Country Club Rd., Perry, GA (US) 31069

(73) Assignee: Kerry Seymour, Perry, GA (US)

( * ) Notice: Subject to any disclaimer, the term of this patent is extended or adjusted under 35 U.S.C. 154(b) by 0 days.

(21) Appl. No.: 09/802,138

(22) Filed: Mar. 8, 2001

(51) Int. Cl.[7] .................... A01G 23/095; A01G 23/08
(52) U.S. Cl. ................. 144/24.13; 144/338; 144/343
(58) Field of Search ................... 144/4.1, 24.13, 144/335, 338, 343

(56) References Cited

U.S. PATENT DOCUMENTS

| | | | |
|---|---|---|---|
| 3,029,848 A | | 4/1962 | Bombardier |
| 3,269,436 A | | 8/1966 | Moore |
| 3,398,774 A | | 8/1968 | Hahn |
| 3,623,521 A | * | 11/1971 | Shields ................ 144/338 |
| 3,635,266 A | | 1/1972 | Eriksson |
| 3,713,467 A | * | 1/1973 | Pierrot, III ............. 144/24.13 |
| 3,757,837 A | * | 9/1973 | French et al. .......... 144/24.13 |
| 3,889,729 A | * | 6/1975 | Pinomaki .............. 144/24.13 |
| 3,948,299 A | | 4/1976 | Laforge et al. |
| 4,130,151 A | * | 12/1978 | Ericsson ............... 144/24.13 |
| 4,350,189 A | | 9/1982 | Duchesne |
| 4,382,457 A | | 5/1983 | Hahn |
| 4,574,855 A | | 3/1986 | Jörgensen et al. |
| 4,766,939 A | | 8/1988 | Forslund |
| 4,981,163 A | | 1/1991 | Westlund |
| 5,174,350 A | | 12/1992 | Johansson et al. |
| 5,406,997 A | | 4/1995 | Davison |
| 5,533,555 A | | 7/1996 | Hudson |
| 5,628,354 A | | 5/1997 | Kingston |
| 5,704,407 A | | 1/1998 | Hamby, Jr. |
| 5,887,635 A | | 3/1999 | Hamby, Jr. |
| 6,155,317 A | | 12/2000 | Seymour |
| 6,167,927 B1 | * | 1/2001 | Holmes, III ............. 144/24.13 |

OTHER PUBLICATIONS

Hahn HTL 300/F Tree Length Processor, manufactured by Hahn Machinery, Inc., specifications sheet. (admitted prior art).

Advertisement Introducing CTR Grapples and the New 550 Delimber; publication date unknown. (admitted prior art).

* cited by examiner

Primary Examiner—W Donald Bray
(74) Attorney, Agent, or Firm—Kilpatrick Stockton; John S. Pratt; Michael K. Dixon

(57) ABSTRACT

A tree delimber including a track, a gripping assembly for gripping the butt end of a tree, and a delimbing assembly movably coupled to the track and includes a delimbing blade and a guide for funneling the tree into the delimbing blade.

20 Claims, 7 Drawing Sheets

DELIMBER

FIELD OF THE INVENTION

This invention relates to logging equipment and, more specifically, to devices used to strip branches off harvested or felled trees.

BACKGROUND OF THE INVENTION

Historically, delimbing felled or harvested trees was performed manually using axes, hand saws and powered chain saws. This method of delimbing works well on large trees with sporadic branches because the weight of a felled tree trunk will snap many of the branches off the trunk leaving a minimal amount of delimbing to be performed. When smaller trees with many branches are felled, the trunk weight is often insufficient to cause the branches to snap off. Consequently, the hand delimbing process was dangerous and unpredictable, as well as time consuming.

As a result, delimbers have been developed which strip the branches off a whole tree at the harvesting site, thereby eliminating the need for manual delimbing and drastically reducing the time necessary for delimbing. The need for a delimbing machine has grown over the years as modern forestry practice has relied on clear cutting and forest thinning through the removal of smaller trees.

A popular type of delimber is the hydro-mechanical delimber. The majority of hydro-mechanical delimbers allow for a tree to be placed in a clamping device, which is generally equipped with some type of gripping jaw. A second movable delimbing device operates on the tree stripping the branches from the tree trunk. The majority of these types of machines contain complex hydraulics and electronics and many moving parts that are susceptible to damage and wear. As a result of the high purchase and operating costs, many logging operations cannot afford to purchase such delimbers. Another disadvantage of these types of delimbers is that they only delimb one or very few trees at the same time. Several of the hydro-mechanical delimbers are discussed below.

U.S. Pat. No. 3,269,463 to Moore is directed to a hydro-mechanical delimbing device. The device comprises a sliding mast assembly having a stationary mast and a traveling mast, which is driven by a cable. Coupled to the bottom of the stationary mast is a tree-gripping and cutting mechanism. A delimbing mechanism is coupled to the bottom of the traveling mast, such that when the mast is raised to the extended position, the delimbing device travels the length of the tree stripping the branches off the tree. The delimbing mechanism includes an arcuate arm, which is pivotably mounted to surround the tree-trunk, when in the closed position. The main disadvantage of the Moore delimber is that it only processes one tree at a time. In addition, the Moore device is integrally formed with a boom. Thus, this device is expensive.

U.S. Pat. No. 4,350,189 to Duchesne is directed to a delimbing device having a telescoping boom including a gripping end and a delimbing end. The felled tree is picked-up by the delimbing end of the boom, and the butt of the tree is placed into the gripping end located at the other end of the boom. Once the tree is held in place by the gripping end, the boom is retracted allowing the delimbing blades to strip the branches from the tree. The main disadvantage of the Duchesne device is that it only processes a single tree at a time. Furthermore, loading the tree into the delimber is cumbersome, and time consuming since the butt of the tree must be placed into the gripping mechanism located at the opposite end of the lifting boom. Finally, the Duchesne device must be loaded or mounted to a carrier and must get the energy to operate from the carrier. Therefore, the Duchesne device is expensive and cumbersome to transport between jobs.

Finally, U.S. Pat. No. 3,398,774 ("'774") and U.S. Pat. No. 4,382,457 ("'457") to Hahn both are directed to a tree delimbing and log processing device. The device comprises a gripping mechanism at one end of a flat bed and a movable carriage, which slide along the bed parallel to the tree-trunk for stripping the branches from the tree. The gripping mechanism contains a chain saw for cutting the delimbed portion of the tree-trunk into lengths suitable for use. The movable carriage contains arcuate blades for surrounding the trunk and stripping the branches. The stripping device is powered by any mechanism suitable for moving the carriage in a forward and rearward direction. In order to place the tree into the clamping mechanism, the butt of the felled tree must be placed into a vice-like clamp formed by a fixed bottom plate and a sliding clamping plate.

The disadvantages of the '774 and '457 devices are twofold. First, the gripping mechanism for holding the butt of the tree is formed from a vice. Therefore, the tree butt must be carefully placed in a small opening, thereby limiting the number of trees that can be processed at a time to one. Since only a single tree can be processed at a time, the process is slow and inefficient. Secondly, and most importantly, the positioning of the delimbing carriage on the devices is such that most, if not all trees, including hardwoods cannot be delimbed by the devices. For example, when a hardwood, or any heavily branched tree is first harvested and placed into these devices, the branches keep the tree trunk from dropping into the movable delimbing carriage. This occurs because the movable delimbing carriage sits flush on the device's bed. Because the trunk of the freshly harvested tree is lifted high above the bed by its branches, the delimbing blades cannot operate on the trunk to strip away the branches. Thus, those devices cannot operate as a delimber for heavily branched trees.

Thus, in reality, the '774 and '457 delimbers are made to process trunks that have already been previously delimbed, having only small short branch stubs still remaining. The '774 and '457 devices, although called delimbers, are really delimbed tree trunk processors. Generally, a delimbed tree trunk is placed in the delimber portion of the devices to remove short branch stubs that remain after the delimbing process. Next, the trunk is fed into a second processing portion that cuts the trunk into logs of a predetermined length. Thus, the '774 and '457 devices are ineffective as true delimbing devices for delimbing unprocessed felled trees and require that the harvested trees be delimbed prior to being operated on by these devices.

Thus, what is needed is a inexpensive hydro-mechanical delimbing mechanism that overcomes the disadvantages of the foregoing devices. More particularly, a hydro-mechanical delimbing device is needed that is effective in delimbing multiple trees at one time, while requiring minimal maintenance and repair.

SUMMARY OF THE INVENTION

This invention is a hydro-mechanical stroke delimbing assembly for delimbing felled trees. The assembly is formed from three main parts: 1) a flatbed frame; 2) a gripping device mounted to the frame; and 3) a delimbing carriage that is movably mounted to the frame and traverses the length of the frame while stripping limbs from a tree trunk or trunks. The blade assembly includes two delimbing arms, each carrying a semi-circular blade and pivots on parallel shafts between: (1) an open position with the arms and blades separated from the path along which tree trunks move in order to sheer off the limbs; and (2) a closed position with the blades positioned near either side of that path. The delimbing carriage is movable through the use of a cable that pulls the carriage forward and backward along the flatbed frame. The gripping device and delimbing carriage are controlled from a knuckle boom loader allowing a single person to operate the knuckle boom loader and the delimbing device simultaneously.

It is a primary object of this invention to provide the logging industry with a hydro-mechanical delimbing device that:

is durable and easy to operate;

is not susceptible to jamming and requires little maintenance and repair;

is inexpensive to operate;

can delimb multiple trees at one time; and can delimb hardwood trees.

Still further objects and advantages will become apparent from a consideration of the ensuing description and drawings.

DETAILED DESCRIPTION OF THE DRAWINGS

Figure 1:
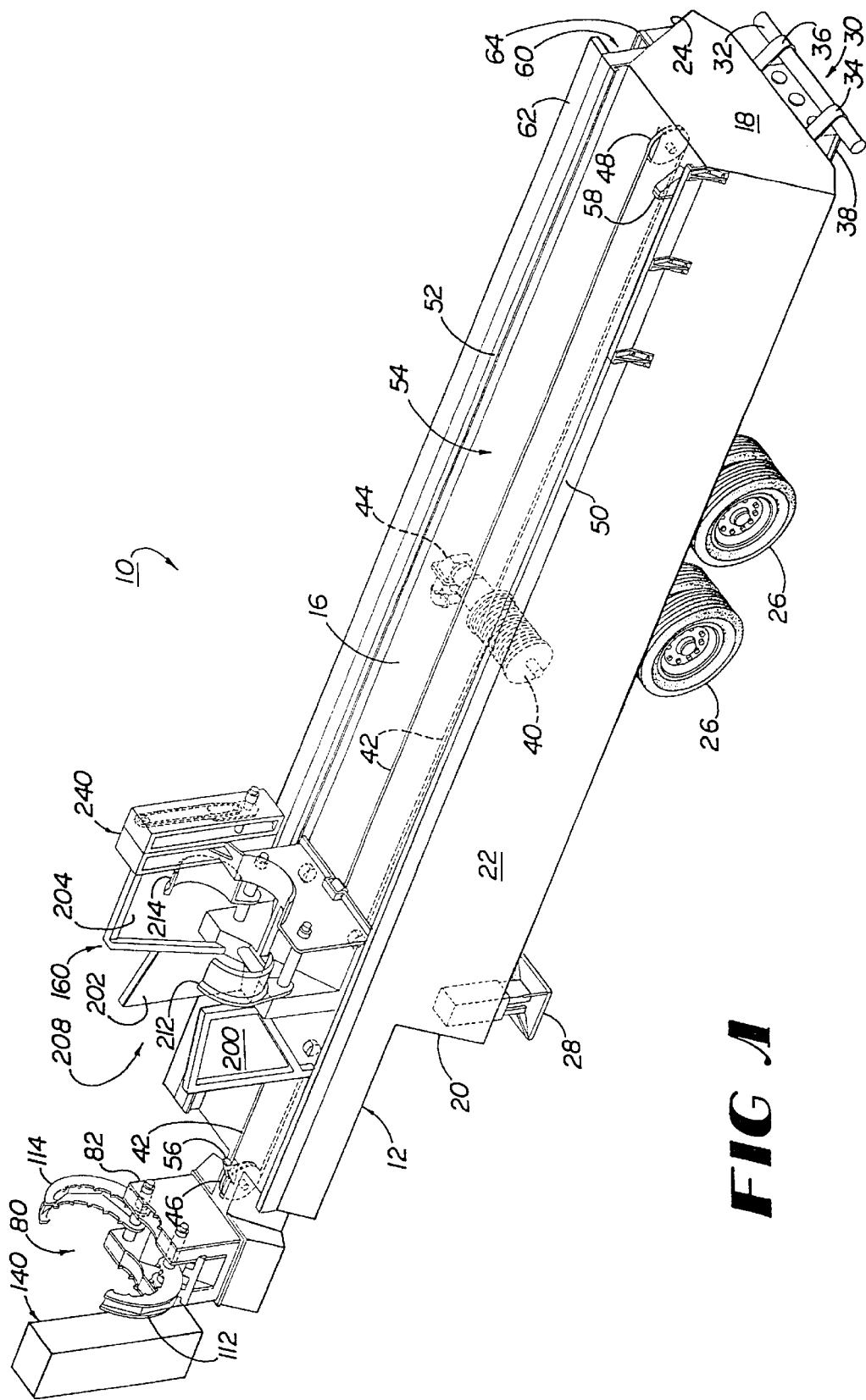
FIG. 1 is a perspective view of an exemplary hydro-mechanical delimbing device of this invention with the grapple arms and delimbing arms open in a tree receiving position.
Figure 2:
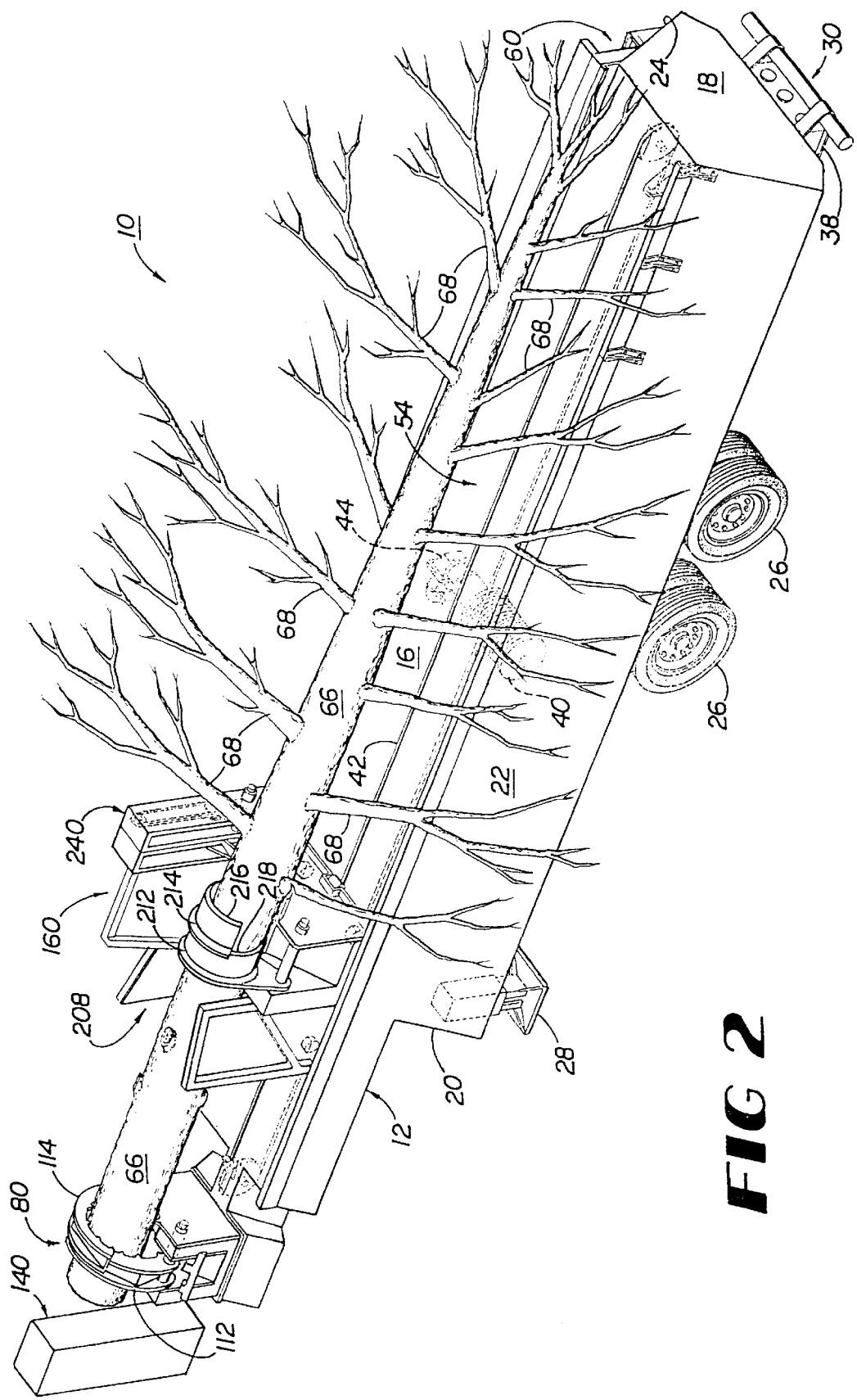
FIG. 2 is a perspective view of the delimbing device of FIG. 1, with the grapple arms and delimbing arms closed around a tree.

FIGS. 1–2 show an overall view of an exemplary hydro-mechanical delimber 10. Delimber 10 operates on a plurality of trees (not shown) or on a single tree 66, FIG. 2. Delimber 10 consists of a carriage transport bed 12, a gripping assembly 80 mounted to bed 12, and a delimbing carriage 160 that is movably mounted to bed 12 and traverses the length of bed 12 while stripping limbs from the tree trunk or trunks.

Carriage transport bed 12 is made from a top, rear, front, left and right steel plates, 16, 18, 20, 22 and 24, respectively, which are attached to an undercarriage frame 38. The plates are welded or otherwise rigidly attached to frame 38, for example, by rivets, etc. Transport bed 12 provides protection for the electrical and hydraulic systems, which are mounted under bed 12. Frame 38 provides both structural support for transport bed 12 and a mounting area for the electrical and hydraulic systems.

A set of wheels 26 are attached to frame 38, which provide support for delimber 10 and allow for ease of transport. A set of leg supports 28 are also attached to frame 38 to provide support and stability. In addition, a backstop 30 is coupled to frame 38, which provides a bumper like structure to protect rear plate 18 and frame 38 when backing delimber 10 into position. Backstop 30 is made from a tubular shaft 32 held by two supports 34 and 36 mounted to frame 38.

A cable drum 40 is mounted to frame 38 and a cable 42 is wound around drum 40. A drum motor 44 is coupled to and rotates drum 40 in both directions. Cable 42 is wound on drum 40 in a manner that allows cable 42 to be wound-up on one end of drum 40 and unwound on the other end of drum 40. Consequently, a single cable 42 drives delimbing carriage 160 in the forward and rearward direction as seen in FIG. 1.

Top plate 16 contains two openings that allow the tops of pulleys 46 and 48 to extend through top plate 16. Cable 42 travels around pulleys 46 and 48, and connects to carriage 160 thereby providing a means to move delimbing carriage 160 along the length of a track 54. Because pulleys 46 and 48 extend through top plate 16, cable 42 does not rub against the edges of the openings in top plate 16, reducing wear and fraying of cable 42 as it moves carriage 160 up and down track 54.

Track 54 generally runs the length of carriage transport bed 12. Two "U" shaped delimbing carriage retainers 50 and 52 are welded or otherwise rigidly attached to top plate 16. Top plate 16 and delimbing carriage retainers 50 and 52 together form carriage transport track 54 on which delimbing carriage 160 moves. Two stops 56 and 58 prevent delimbing carriage 160 from sliding past pulleys 46 and 48 off track 54. Stops 56 and 58 are formed from steel or other suitable material and are attached by weldments or any other suitable means.

Figure 6A:
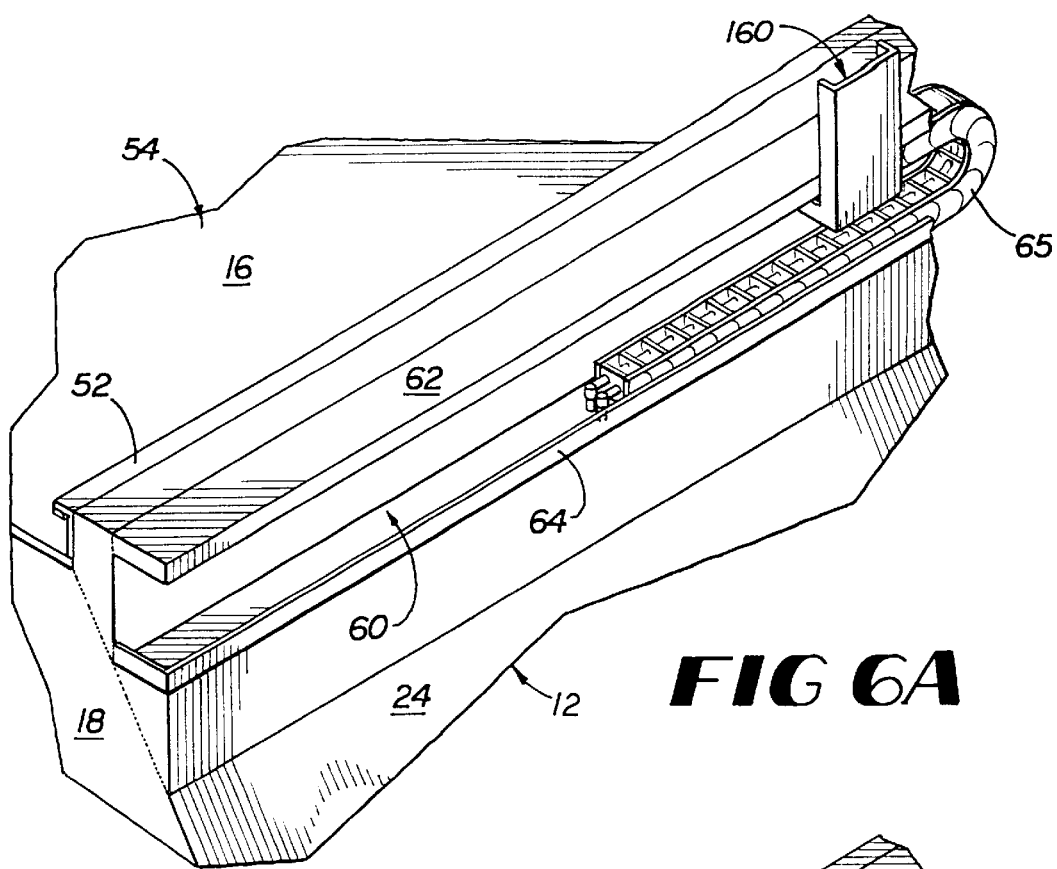
FIGS. 6A and 6B are perspective views of the energy harness used to power the delimbing carriage of the delimbing device of FIGS. 1–2.
Figure 6B:
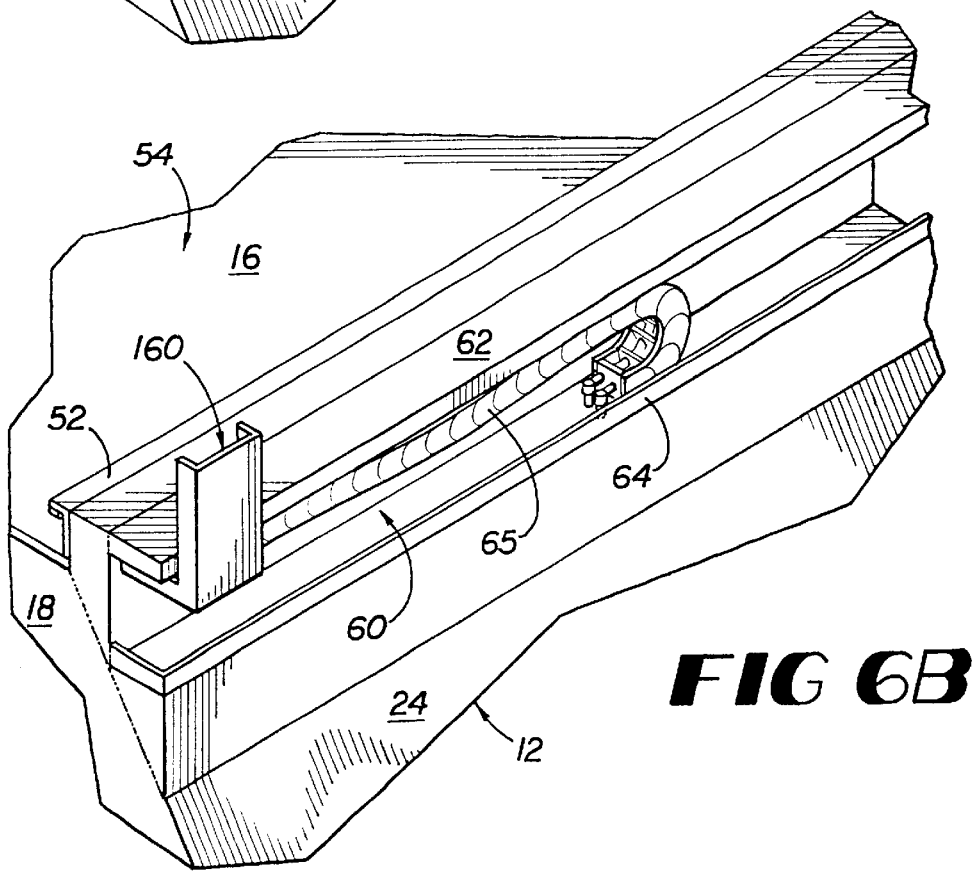

Attached to right plate 24 are two parallel metal beams 62 and 64 which form a track 60, FIGS. 6A and 6B. Track 60 holds a coiled energy harness 65 which coils and uncoils as delimbing carriage 160 traverses the length of track 54. Energy harness 65 contains hydraulic hoses and electrical wires necessary to power delimber carriage 160. Metal beams 62 and 64 help contain energy harness 65 within track 60 and protect it from any falling debris that would ordinarily come into contact with energy harness 65.

Figure 5:
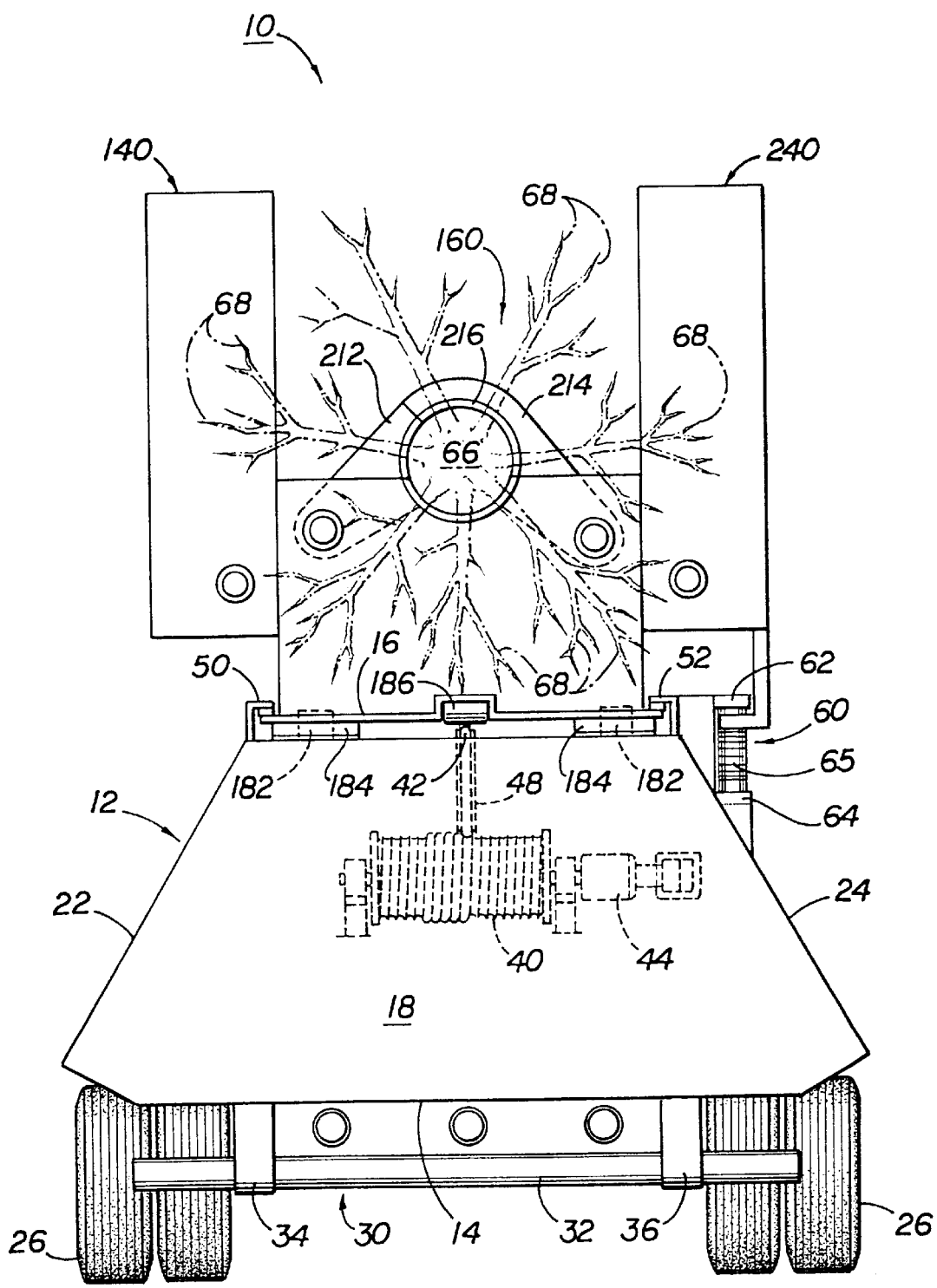
FIG. 5 is a rear elevational view of the delimbing device, of FIGS. 1–2, with the delimbing arms closed around a tree.

FIG. 2 shows a tree 66 with numerous branches 68 resting in delimber 10. Grapple arms 112 and 114 are closed around the butt of tree 66 and delimbing blades 216 and 218 are closed around the trunk of tree 66 as shown. As seen in FIG. 5, since blades 216 and 218 are mounted in a carriage with ample clearance above track 54, tree 66 is able to rest in the delimbing blades in spite of the radially extending branches. Had delimbing blades 216 and 218 been mounted on a carriage that did not provide adequate clearance for the limbs, the limbs would inhibit the trunk from properly resting within the delimbing blades causing the delimber to be inoperable.

Figure 3:
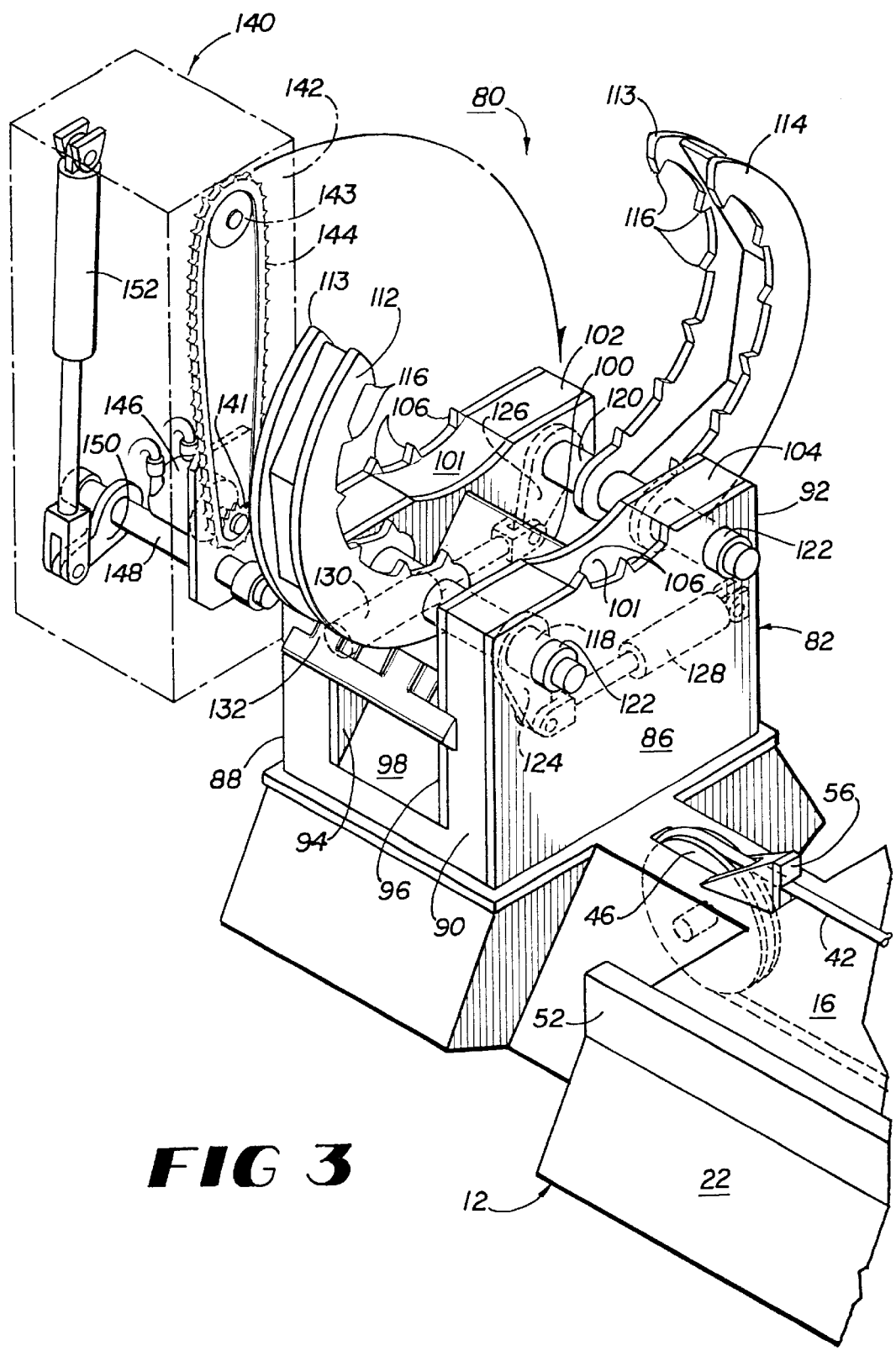
FIG. 3 is an enlarged detailed perspective view of the gripping assembly and saw assembly of the delimbing device of FIGS. 1–2.

Gripping assembly 80, as shown in FIG. 3, is mounted at the end of bed 12. A "U"-shaped box frame 82 is formed from a rear, front, left and right steel plates 86, 88, 90, 92, respectively. Left and right plates 90 and 92 are "U"-shaped. The plates are welded or otherwise rigidly attached to each other and to top plate 16. Box frame 82 consists of several additional steel plates as follows: (1) inner front plate 94 and inner rear plate 96, which form the inner walls of the "U"

Shaped box, and (2) two additional angled base plates 98 and 100, which form the floor of the "U"-shaped box. The inside edges of base plates 98 and 100 are coupled together and base plates 98 and 100 are slanted downward away from the center of box frame 82, so that any loose debris is discharged out of gripping assembly 80 and onto the ground.

Inner front and rear plates 94 and 96 are welded or otherwise rigidly attached to left and right plates 90 and 92 and to a front top and rear top plate 102 and 104. Front top and rear top plates 102 and 104 form the actual top of box frame 82. Integrally formed teeth 106 extend from front and rear plates 86 and 88, which abut and are rigidly attached to front top and rear top plates 102 and 104. Arcuate edges 101 of front top and rear top plates 102 and 104 form a seat where the knuckle boom loader places the butt end of a tree trunk that is to be delimbed, and teeth 106 in front and rear plates 86 and 88 aid in holding the trunk in position.

Grapple arms 112 and 114 are attached to box frame 82 by two parallel actuated shafts 118 and 120. Actuated shafts 118 and 120 are mounted between and through rear plate 86, inner rear plate 96, inner front plate 94, and front plate 88. Shafts 118 and 120 are secured by a set of sleeves 122, or similar fasteners for example, bolts, etc. Grapple arms 112 and 114 have numerous integrally formed teeth 116 for gripping and holding the butt end of a tree or trees. Moreover, grapple arms 112 and 114 are separately coupled to actuator shafts 118 and 120 respectively, allowing for each arm to pivot about the axis of shafts 118 and 120. Grapple arms 112 and 114 are arcuate in shape allowing them to fit snugly around the circular-shaped trunk or group of trunks.

A crank arm 124 is coupled to shaft 118 at one end and to a hydraulic actuator cylinder 128 at its opposite end, as illustrated in FIG. 3. Likewise, a crank arm 126 is coupled to shaft 120 at one end and to an actuator cylinder 130 at its opposite end. The above described combination allows grapple. Arms 112 and 114 to open and close around a trunk, or group of trunks, holding it in place as the branches are stripped from the tree. This configuration also allows for grapple arm 112 to open in the counter-clockwise direction independently of grapple arm 114, which opens in the clockwise direction. Further, grapple arms 112 and 114 open to allow the trunk to be removed from delimber 10 after a trunk has been delimbed. Grapple arms 112 and 114 are controlled by the knuckle boom operator using hydraulic controls normally located in the knuckle boom cab.

As grapple arms 112 and 114 open and close along the axes of shafts 118 and 120 respectively. Stops 132 (one of which is invisible in FIG. 3) prevent grapple arms 112 and 114 from opening past a certain point and also from closing past a certain point. Stops 132 operate by providing a barrier that comes into contact with the backs of arms 112 and 114 when they are opened and with the top edges 113 of arms 112 and 114 when they are in the closed position. Stop 132 is welded or otherwise rigidly attached to left plate 90, and its counterpart stop (not shown) is rigidly attached to right plate 92.

Saw box 140 consists of a saw guard 142, a saw chain 144, a hydraulic saw motor 146, an actuator shaft 148, a crank arm 150, and an actuator cylinder 152. Saw box 140 is rigidly attached to the front end of delimber 10. Saw box 140 is used to cut off the butt end of trees that have been delimbed. Saw guard 142 is made from a rigid material, such as welded steel plates. Saw guard 142 protects the working components from being jammed by debris and it also houses the saw chain 144 when in the retracted position. Saw 144 is coupled to and driven by a hydraulic saw motor 146 and sprocket 141. Saw chain 144 is coupled to sprocket 141 at one end and is also coupled to a second sprocket 143 at the other end. Moreover, saw 144 is coupled to actuator shaft 148 and is rotated about the axis of shaft 148. Shaft 148 is also coupled to crank arm 150, which is coupled to actuator cylinder 152. This configuration allows saw 144 to rotate about the axis of shaft 148 extending from guard 142 to cut the butt end of a trunk or group of trunks.

Figure 4:
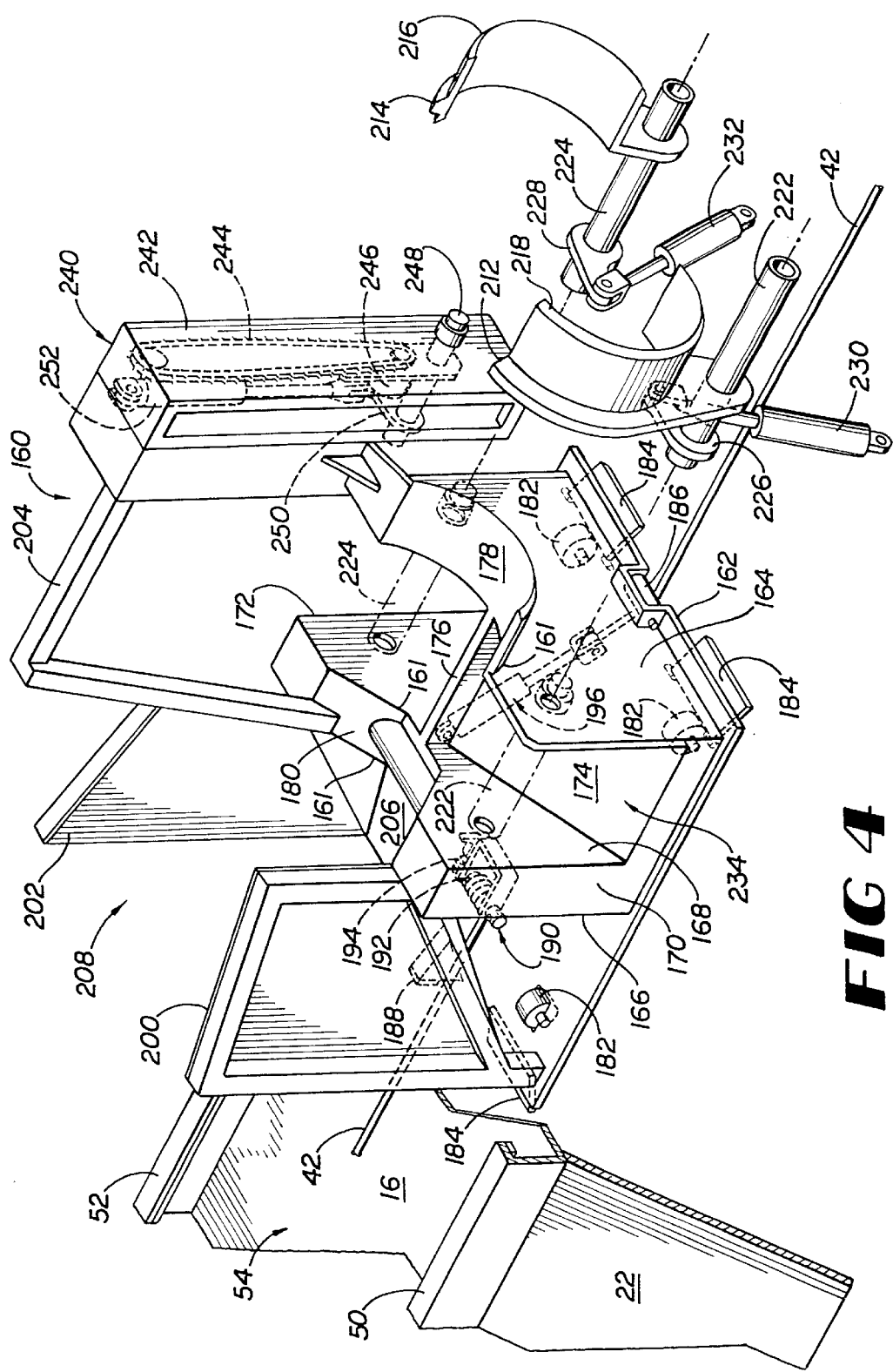
FIG. 4 is an enlarged detailed perspective view of the delimbing carriage and saw assembly of the delimbing device of FIGS. 1–2.

Delimbing carriage 160, as shown in FIG. 4, is movably mounted to slide along bed 12. Delimbing carriage 160 is made from a base, rear, outer front, inner front, left, and right steel plates 162, 164, 166, 168, 170 and 172, respectively. As shown in FIG. 4, left and right plates 170 and 172 are generally "L"-shaped. Rear 164, outer front 166 and inner front 168 plates are positioned perpendicular to base plate 162 and have a concave indentation 161 at the top of each plate. The plates are welded or otherwise rigidly attached.

Two additional angled base plates 174 and 176 form the floor of delimbing carriage 160. The inside edges of base plates 174 and 176 are coupled together and are slanted downward away from the center of delimbing carriage 160. This configuration discharges loose debris out of carriage 160 onto the ground through debris access openings 234, located on each side of carriage 160. Additionally, as delimbing carriage 160 moves down track 54, carriage 160 pushes debris off track 54 so that it does not interfere with the operation of delimber 10.

An arcuate stationary delimbing blade 178 is rigidly attached to rear plate 164 at the integrally formed concave indent 161 and curved top plate 180 is rigidly attached to outer front and inner front plates 166 and 168 at their integrally formed concave indents 161. Arcuate blade 178 and curved plate 180 form the top of delimbing carriage 160 where a tree or trees rest during delimbing. The concave shape of the top of carriage 160 allows trees to be easily placed into carriage 160. Furthermore, since delimbing arms 212 and 214 are mounted high above track 54 within carriage 160, large trees with many branches may be placed into delimber 10 without interference from track 54, as shown in FIG. 5. If delimbing arms 212 and 214 were mounted on a smaller carriage closer to bed 12, the tree limbs would cause the trunk to sit well above the delimbing blades rendering the delimber inoperable for its intended purpose.

Wheels 182 are attached to base plate 162 to allow carriage 160 to move smoothly along tract 54. Also attached to base plate 162 is a set of wiper blades 184. Wiper blades 184 extend out from delimbing carriage 160 over wheels 182 to protect and remove any debris from the path of wheels 182. The tops of wiper blades 184 are pivotably mounted to carriage 160 using, for example, a hinged connection.

A cable guide 186 formed from a metal tube is attached to base plate 162 in its rear center. Guide 186 is stationary and keeps cable 42 below delimbing carriage 160 allowing delimbing carriage 160 to move steadily along track 54 without cable 42 fraying from contact with the edge of base plate 162. A stop 188 is attached at the front of base plate 162 and meets with stop 56 to prevent delimbing carriage 160 from moving forward past pulley 46.

Still referring to FIG. 4, a cable take-up assembly 190 is coupled to carriage 160, which includes cable take-up spool 192 and ratchet 194. The purpose of cable take-up assembly 190 is to remove slack from cable 42, which may form over time from tension on cable 42. One end of cable 42 extends from drum 40, travels around pulley 46 and is attached to take up spool 192. As slack develops in Cable 42, ratchet 194 is used to actuate spool 192 to take up the slack in cable 42, effectively shortening the length of cable 42. Eventually, when no additional slack can be wound around spool 192, cable 42 is removed from spool 192, cut shorter and reattached.

In order to maintain tension in cable 42 as carriage 160 moves along track 54. The second end of cable 42 extends from drum 40 around pulley 48 and attaches to tensioner 196. Tensioner 196 is formed from a hydraulic cylinder. In operation, the hydraulic cylinder is in an extended mode, which provides continuing pulling tension on cable 42 during operation of carriage 160. Because tensioner 196 applies tension to cable 42, cable 42 is maintained with minimal slack eliminating the possibility for cable 42 to get caught under or wrapped around any moving parts of delimber 10.

Guides 200, 202 and 204 are attached to base plate 162. Guides 200 and 202 along with an angled plate 206 create a funnel area 208 for directing a tree or multiple trees into delimbing arms 212 and 214. Angled plate 206 is attached to and extends upward and rearward from the front edge of base plate 162 and attaches to outer front plate 166. Funnel 208 is an extremely useful feature of delimber 10. For example, when delimbing carriage 160 moves rearward past the end of a tree trunk such that a trunk exits delimbing arms 212 and 214, funnel 208 helps to guide the trunk back into the area of delimbing arms 212 and 214.

Delimbing arms 212 and 214 are attached to delimbing carriage 160 by parallel actuator shafts 222 and 224. Actuator shafts 222 and 224 are mounted between rear plate 164, outer front plate 166, and inner front plate 168 respectively. Delimbing arms 212 and 214 are semi-circular, which allows them to fit snugly around the round trunks or group of trunks. Curved delimbing blades 216 and 218 are mounted on delimbing arms 212 and 214 to strip branches from the trunk as carriage 160 moves backward down track 54.

A crank arm 226 is coupled to shaft 222 at one end and coupled to actuator cylinder 230 at its opposite end, as illustrated in FIG. 4. Likewise, crank arm 228 is coupled to shaft 224 at one end and coupled to actuator cylinder 232 at its opposite end. Delimbing arms 212 and 214 are coupled to carriage 160 as described above to allow delimbing arms 212 and 214 to open and close around a trunk or group of trunks. Furthermore, the described configuration allows for delimbing arm 212 to open in the counter-clockwise direction independently of delimbing arm 214, which opens in the clockwise direction. Once a tree has been delimbed, delimbing arms 212 and 214 are opened to allow the trunk to be removed. Like gripping arms 112 and 114, delimbing arms 212 and 214 are controlled remotely and independently operated from gripping arms 112 and 114.

Delimbing carriage 160 also includes a saw box 240. Saw box 240 is connected or otherwise rigidly attached at the right rear of delimbing carriage 160. Saw box 240 consists of saw guard 242, saw blade 244, hydraulic saw motor 246, actuator shaft 248, crank arm 250, and actuator cylinder 252. The purpose of saw box 240 is to cut the top off of the delimbed trees.

Saw guard 242 protects the working components of saw box 240 from falling debris or other damage. Saw 244 is coupled to and driven by hydraulic saw motor 246. Additionally, saw 244 is coupled to actuator shaft 248, which allows for saw 244 to pivot in and out of sawguard 242, one end of crank arm 250 is coupled to shaft 248 and the other to actuator cylinder 252. This configuration allows saw 244 to move about the axis of shaft 248 in order to cut off the top portion of a trunk or group of trunks, which have been placed in delimber 10.

Operation of delimber 10 begins when a knuckle boom loader places the tree in delimber 10 as shown in FIG. 2. Once the tree is placed in delimber 10, the operator closes grapple arms 112 and 114 and delimbing arms 212 and 214 (with delimbing blades 216 and 218) around the tree. The operator then moves delimbing carriage 160 down track 54 using cable 42. As delimbing carriage 160 moves down track 54, delimbing blades 216 and 218 cut off the tree branches from the tree trunk as wiper blades 184 and debris openings 234 move the cut limbs and debris off track 54 and out of the path of delimbing carriage 160. The operator may continue to move delimbing carriage 160 forward and backward along track 54 until the tree has been delimbed to the operator's satisfaction. Once the tree is satisfactorily delimbed, grapple arms 112 and 114 and delimbing arms 212 and 214 are opened by the operator, who then uses the knuckle boom loader to remove the delimbed tree from delimber 10.

Figure 7:
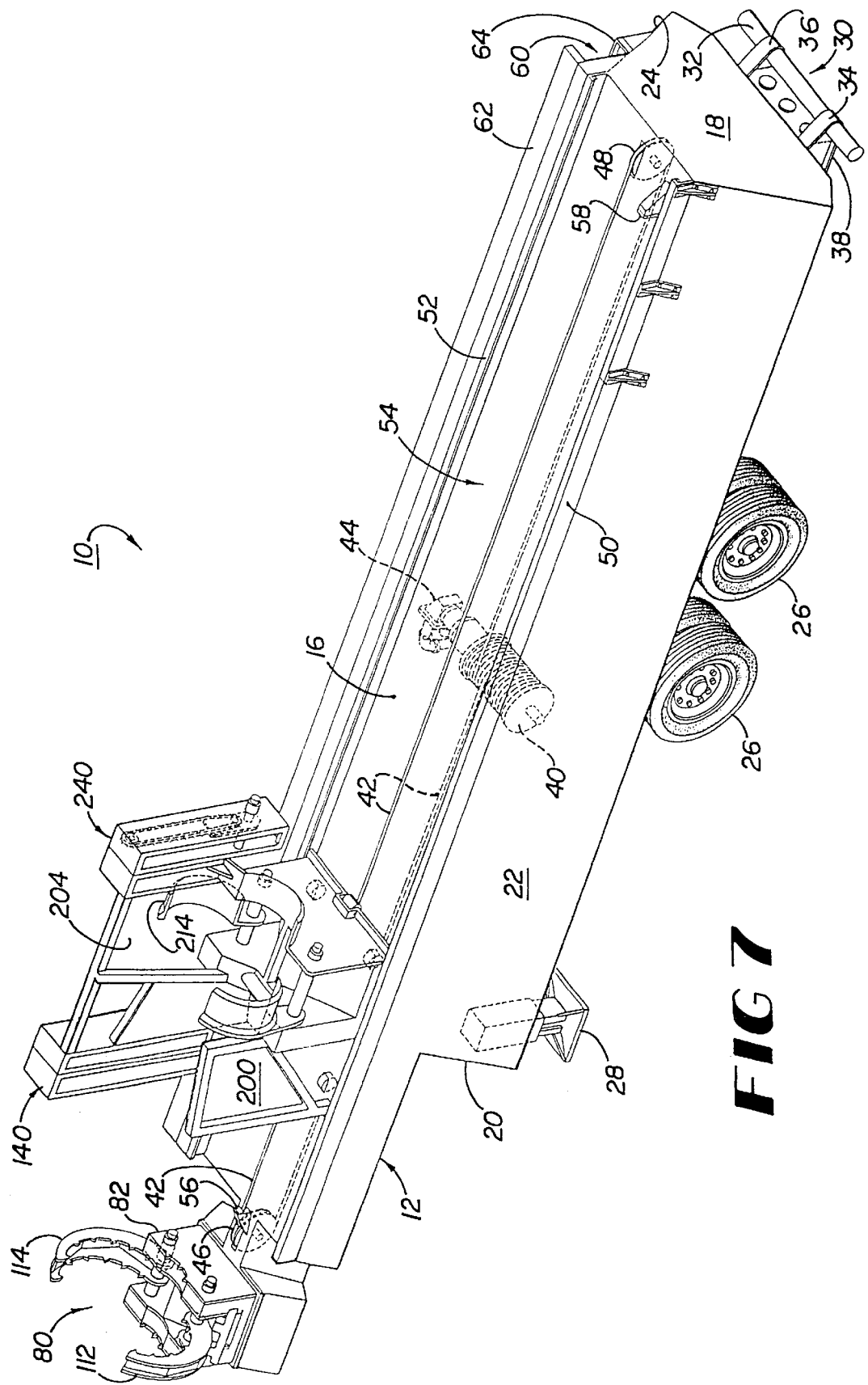
FIG. 7 is a perspective view of an alternate embodiment of the exemplary hydro-mechanical delimbing device of this invention.

FIG. 7 discloses an alternate embodiment of the delimber of this invention. In delimber 10 of FIG. 7, like numbers are used to represent like parts as in delimber 10 of FIG. 1. The delimber of FIG. 7 differs slightly from the delimber of FIG. 1 in that saw box 140 is moved from grapple assembly 80 to the back end of delimbing carriage 160. The addition of saw box 140 on the back end of delimbing carriage 160 offers several advantages. For example, delimber 10 of FIG. 7 can be used to delimb and process trunks by cutting the trunks into differing lengths. This is carried out by measuring the length of the log by moving delimbing carriage 160 along track 54 and then cutting the delimbed log with saw box 140, which is now located on the back end of delimbing carriage 160. The measurement can be carried out by translating the movement of carriage 160 from gripping assembly 80 into a length, which may be displayed to the operator. In addition, the operation of removing valuable scrap logs from delimber 10 is made simpler since any scrap log is left laying on track 54, as opposed to being discharged onto the floor.

The foregoing is provided for purposes of illustrating, explaining, and describing embodiments of the present invention that provide a device for delimbing trees in a safe and economical manner. Modifications and adaptations to these embodiments will be apparent to those skilled in the art and may be made without departing from the scope or spirit of the invention or the following claims.

What I claim is:

1. A tree delimbing device, comprising:
   a. a track comprising a proximal end and a distal end coupled to a frame capable of supporting a plurality of trees;
   b. a gripping assembly mounted to the distal end of the track for gripping a butt end of at least one tree; and
   c. a delimbing assembly movably coupled to the track for movement along the track between the proximal and distal ends, the delimbing assembly comprising:
      i. a first arcuate delimbing blade in spaced apart relation from the track so that the track does not interfere with the radially extending limbs of the at least one tree;
      ii. a second arcuate delimbing blade rotatably coupled to the delimbing assembly to work in cooperation with the first arcuate delimbing blade to delimb at least one tree;

iii. a delimbing blade fixedly coupled to the delimbing assembly proximate to the first and second arcuate delimbing blades for delimbing and supporting the at least one tree; and iv. a saw coupled to the delimbing assembly for topping at least one tree positioned within the delimbing assembly.

2. The delimber of claim 1, the delimbing assembly further comprising a funnel coupled to the delimbing assembly proximate to the delimbing blades for positioning the at least one tree.

3. The delimber of claim 1, the gripping assembly further comprising a first gripping arm.

4. The delimber of claim 3, the gripping assembly further comprising a second gripping arm.

5. The delimber of claim 4, wherein the gripping arms contain teeth for gripping the butt of the tree.

6. The delimber of claim 4, wherein the gripping arms are actuated to open and close around the butt of the tree.

7. The delimber of claim 6, the gripping assembly further comprising a fixed gripping jaw positioned in relation to the actuated gripping arms so that the butt of the tree is secured between the fixed gripping jaw and the actuated gripping arms.

8. The delimber of claim 7, further comprising a plurality of fixed gripping jaws each containing teeth.

9. The delimber of claim 7, the gripping assembly further comprising a saw box.

10. The delimber of claim 9, wherein the saw box contains a movable saw blade for cutting the butt end of the tree.

11. The delimber of claim 1, further comprising a transport cable for moving the delimbing assembly along the track.

12. The delimber of claim 11, further comprising a cable take up spool for removing slack from the transport cable.

13. The delimber of claim 11, further comprising a cable tension assembly for maintaining a constant tension on the transport cable, the cable tension assembly comprising at least one hydraulic cylinder coupled to the delimbing assembly and to the transport cable, and a cable take-up assembly for removing slack from the cable, the cable take-up assembly comprising a ratchet and spool for shortening the length of the cable.

14. The delimber of claim 1, the delimbing assembly further comprising a saw box coupled to the delimbing assembly for housing the saw.

15. The delimber of claim 1, the delimbing assembly further comprising a second saw box.

16. The delimber of claim 15, wherein the second saw box contains a second movable saw blade for cutting the delimbed tree into predetermined lengths.

17. The delimber of claim 1, the delimbing assembly further comprising wheels for moving the delimbing assembly along the track.

18. The delimber of claim 1, wherein the delimbing assembly is coupled to the guide rails using the wheels and moves along the track in a linear path between the distal and proximal ends of the track.

19. The delimber of claim 17, wherein the delimbing assembly further comprises at least one wiper blade positioned proximate to the wheels for protecting the wheels and for removing debris from paths of the wheels.

20. The delimber of claim 1, the frame further comprising opposed U-shaped guide rails on each side of the track extending generally from the proximal to distal end of the track.

* * * * *